United States Patent
Yang et al.

(10) Patent No.: US 8,121,740 B2
(45) Date of Patent: Feb. 21, 2012

(54) FEEDER AUTOMATION FOR AN ELECTRIC POWER DISTRIBUTION SYSTEM

(75) Inventors: Fang Yang, Raleigh, NC (US); James Stoupis, Durham, NC (US); Vaibhav Donde, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 514 days.

(21) Appl. No.: 12/338,302

(22) Filed: Dec. 18, 2008

(65) Prior Publication Data
US 2010/0161151 A1   Jun. 24, 2010

(51) Int. Cl.
G05D 3/12 (2006.01)
G05D 5/00 (2006.01)
G05D 9/00 (2006.01)
G05D 11/00 (2006.01)
G05D 17/00 (2006.01)
G05D 23/00 (2006.01)
G11C 29/00 (2006.01)

(52) U.S. Cl. ........ 700/292; 700/283; 700/294; 700/297; 714/764

(58) Field of Classification Search .................. 700/292, 700/283, 294, 297; 714/764
See application file for complete search history.

(56) References Cited

U.S. PATENT DOCUMENTS

| | | | |
|---|---|---|---|
| 7,110,231 B1* | 9/2006 | De La Ree et al. | 361/71 |
| 2003/0231440 A1* | 12/2003 | Papallo et al. | 361/3 |
| 2004/0158772 A1* | 8/2004 | Pan et al. | 714/14 |
| 2005/0251296 A1* | 11/2005 | Tracy Nelson et al. | 700/292 |
| 2008/0225452 A1* | 9/2008 | Stoupis et al. | 361/62 |
| 2009/0112375 A1* | 4/2009 | Popescu | 700/292 |
| 2009/0125158 A1* | 5/2009 | Schweitzer et al. | 700/293 |
| 2009/0290275 A1* | 11/2009 | Staszesky et al. | 361/63 |
| 2010/0036538 A1* | 2/2010 | Stergiou et al. | 700/292 |

OTHER PUBLICATIONS

Yang et al. "Study of Shipboard Power System Intelligent Network Reconfiguration", 2006, IEEE.*
Kumar et al. "Adequacy Equivalents in Composite Power System Evaluation", Aug. 1988, IEEE Transactions on Power Systems vol. 3, No. 3, pp. 1167-1173.*
Electric Power Research Institute, IntelliGrid, downloaded Dec. 18, 2008, 1 sheet, http://www.intelligrid.epri.com/IntelliGrid/.
G. Ockwell, Implementation of Network Reconfiguration for Taiwan Power Company, IEEE PES General Meeting, 2003, pp. 2430-2434.
Staszesky, et al., Advanced Feeder Automation is Here, IEEE Power & Energy Magazine, Sep./Oct. 2005, pp. 56-63.

(Continued)

Primary Examiner — Albert Decady
Assistant Examiner — Jason Lin
(74) Attorney, Agent, or Firm — Driggs, Hogg, Daugherty & Del Zoppo Co., L.P.A.

(57) ABSTRACT

A soft PLC technology based computer-implemented method includes updating a system configuration incidence matrix for an electric power distribution system based on both a depth-first search of a connectivity matrix for the electric power distribution system and information about the electric power distribution system, wherein the information includes at least status information about one or more switches of the electric power distribution system. The method further includes detecting a fault in the system based on the incidence matrix. The method further includes generating isolation control logic based on the incidence matrix and isolating the fault based on isolation control logic. The method further includes generating restoration control logic based on a breadth-first search of the incidence matrix and restoring the system based on the restoration control logic.

29 Claims, 13 Drawing Sheets

OTHER PUBLICATIONS

Fan et al., Feeder Automation with in the Scope of Substation Automation, Power System Conference and Exposition, Nov. 2006, pp. 607-612.

Devi, et al., Optimal Restoration of Power Supply in Large Distribution System in Developing Countries, IEEE Transactions on Power Delivery, Jan. 1995, pp. 430-438vol. 10, No. 1.

Wu, et al., A Heuristic Search Approach to Feeder Switching Operations for Overload Faults Unbalanced Flow and Maintenance, IEEE Transactions on Power Delivery, Oct. 1991, pp. 1579-1585, vol. 6, No. 4.

Taylor, et al., Implementation of Heuristic Search Strategies for Distribution Feeder Reconfiguration, IEEE Transaction on Power Delivery, Jan. 1990, pp. 239-246.

Moon, et al., Fault Restoration Algorithm Using Fast Tracing Technique based on the Tree-Structured Database for the Distribution Automation System, IEEE PES Summer meeting 2000, pp. 411-415.

Liu, et al., An Expert System Operation Aid for Restoration and Loss Reduction of Distribution System, IEEE Transactions on Power System, May 1988, pp. 619-626, vol. 3, No. 2.

C. Huang, Multi-objective Service Restoration of Distribution System Using Fuzzy Cause-Effect Networks, IEEE Transaction on Power Systems, May 2003, pp. 867-874, vol. 18, No. 2.

Hsiao, et al., Enhancement of Restoration Service in Distribution Systems Using a Combination Fuzzy GA Method, IEEE Transactions on Power Systems, Nov. 2000, pp. 1394-1400, vol. 15, No. 4.

Y. Ke, et al., Distribution Feeder Reconfiguration for Load Balancing and Service Restoration by Using G-Nets Inference Mechanism, IEEE Transactions on Power Delivery, Jul. 2004, pp. 1426-1433, vol. 19, No. 3.

Wu, et al., A Petri-Net Algorithm for Multiple Contingencies of Distribution System Operation, IEEE Transactions on Power Systems. Aug. 1998, pp. 1164-1171, vol. 13, No. 3.

Y Ke, et al., Distribution Feeder Reconfiguration for Load Balancing and Service Restoration by Using G-Nets Inference Mechanism, IEEE Transactions on Power Delivery, Jul. 2004, pp. 1426-1433, vol. 19, No. 3.

Zhou, et al., Distribution Feeder Reconfiguration for Service Restoration and Load Balancing, IEEE Transactions on Power Systems, May 1997, pp. 724-729, vol. 12, No. 2.

Miu, et al., Fast Service Restoration for Large-Scale Distribution System with Priority Customers and Constraints, IEEE Transactions on Power Systems, Aug. 1998, pp. 789-795, vol. 13, No. 3.

Chen, et al., A Rule-Based Expert System with Colored Petri Net Models for Distribution System Service Restoration, IEEE Transactions on Power Systems, Nov. 2002, pp. 1073-1080, vol. 17, No. 4.

Cox, et al., Self-Healing Networks: Performance Improvement by Automated Switching Algorithm, CIRED Seminar 2008: SmartGrids for Distribution, Jun. 23-24, 2008, paper No. 0006, pp. 1-4, Frankfurt.

* cited by examiner

FEEDER AUTOMATION FOR AN ELECTRIC POWER DISTRIBUTION SYSTEM

BACKGROUND

The following generally relates to electric power distribution system feeder automation, and more particularly relates to soft PLC technology-based feeder automation logic development and implementation.

Electric utilities often rely on a trouble call system where customers can report outages to the utility. More specifically, when a fault occurs and customers experience a power outage, a customer(s) may call the utility and report the power outage. After receiving the power outage report, the utility may send a crew to the field to investigate the fault location and figure out and implement a switching scheme to first isolate the fault and then restore service to as many impacted customers as possible while the faulty feeder part is being repaired.

By using feeder automation logic, the crew no longer has to be sent out to troubleshoot the fault. Feeder automation logic automatically alters the topological structure of feeder systems by changing the open/close status of switches under abnormal operating conditions. In particular, when a fault occurs, feeder automation logic automatically selectively changes switch states to isolate a fault and restore power to as much load as possible. Feeder automation logic can reduce the power outage duration relative to sending out a crew to troubleshoot a fault and improve the distribution system reliability level.

When used in connection with network communication and distributed control, feeder automation at the network level is enabled. That is, the feeder system operating condition can be monitored and controlled by a feeder automation controller and multiple intelligent electronic devices (IED) that are equipped with switches in the feeder network. The IEDs send system information to the controller and in response the controller executes the feeder automation logic that identifies a fault and the location of the fault and fault isolation and power restoration solutions. The fault isolation and power restoration control commands are then sent to the IEDs, which implement the switch status change accordingly.

Feeder automation logic can be implemented in either a centralized or a distributed scheme. The centralized feeder automation scheme includes master controllers located in substations and IEDs associated with switches in the feeder network. The master controllers communicate with the IEDs in a master-to-slave mode. The master controller can be either a high-end industrial computer or a low-end programmable logic controller (PLC) or IEDs. In the distributed feeder automation scheme, each IED associated with a switch in the feeder network may work as a local feeder automation controller that communicates with other IEDs in a peer-to-peer mode to collect the network information and execute the feeder automation algorithms. The IEDs are used as local controllers.

High-end industrial computers enable the use of an advanced, high-end programming environments and languages (such as Visual Studio, C#, C++, etc.) to implement complex feeder automation logic. As a result, the development of feeder automation logic is efficient and the developed logic can provide end users (e.g., general field electrical engineers) with user-friendly interfaces. More recently, soft PLC technology has been used in electric power applications. Soft PLC is software that allows users to build PLC programs on standard computers. Soft PLC software runs on an ordinary computer and mimics the operation of a standard PLC and supports the IEC 61131-3 standard. The soft PLC programs can be downloaded to both PLCs and IEDs.

Unfortunately, some field engineers may not be able to easily understand or customize feeder automation logic that is developed based on the advanced, high-end programming environments and languages (such as Visual Studio, C#, C++, etc.). Such engineers often prefer to use low-end programming tools, controllers such as PLCs or, and the IEC 61131-3 standard PLC programming languages such as ladder diagram (LD), function block diagram (FBD), sequential function chart (SFC), structured text (ST), and instruction list (IL) as they can easily understand and customize the feeder automation logic. Unfortunately, logic developed using low-end tools generally require a high degree of effort and developers often have to build the logic from scratch. Moreover, the resulting feeder automation logic often is dependent on proprietary PLC hardware specifications and cannot be generalized.

SUMMARY

Aspects of the present application address these matters, and others.

According to one aspect, a computer-implemented method includes updating a system configuration incidence matrix for an electric power distribution system based on both a depth-first search of a connectivity matrix for the electric power distribution system and information about the electric power distribution system, wherein the information includes at least status information about one or more switches of the electric power distribution system. The method further includes detecting a fault in the system based on the incidence matrix. The method further includes generating isolation control logic based on the incidence matrix and isolating the fault based on isolation control logic. The method further includes generating restoration control logic based on a breadth-first search of the incidence matrix and restoring the system based on the restoration control logic.

According to another aspect, a system includes a first component that updates a system configuration incidence matrix of an electric power distribution system based on a depth-first search of a connectivity matrix of an electric power distribution system. The system further includes a second component that detects a fault in the system based on the incidence matrix. The system further includes a third component that generates isolation control logic based on the incidence matrix. The system further includes a fourth component that isolates the fault based on isolation control logic. The system further includes a fifth component that generates restoration control logic based on a breadth-first search of the incidence matrix. The system further includes a sixth component that restores the system based on the restoration control logic.

According to another aspect, an architecture that integrates low-end soft PLC technology with high-end constituents, the architecture includes a user interface that accepts user input related at least to system topology and system configuration, a component that generates logic based on the user input, and a soft PLC plug-in that transfers logic to a soft PLC product.

Those skilled in the art will appreciate still other aspects of the present application upon reading and understanding the attached figures and description.

FIGURES

The present application is illustrated by way of example and not limitation in the figures of the accompanying drawings, in which like references indicate similar elements and in which.

DESCRIPTION

The following relates to feeder automation for an electric power distribution system. As described herein, the feeder automation logic can be based on soft PLC software or the like and provide at least one of the following functions: a dynamic update of the system configuration and the load profile; and generic fault resolution logic, which is generated based on a real-time system configuration and load profile, for fault location detection, fault isolation, and/or power restoration after the occurrence of a fault in the feeder network.

As used herein, the term "hard PLC (programmable logic controller)" shall mean a rugged microprocessor-based controller that is adapted to control manufacturing, industrial and power distribution processes. A hard PLC runs a control program that is written in one of the IEC 61131-3 standard programming languages, namely LD, FBD, SFC, ST and IL. As used herein, the term "soft PLC" shall mean software used in a general purpose computer, such as a personal computer (PC), or in an embedded processor that emulates the functions of a hard PLC.

Such feeder automation logic can be developed using standard PLC programming languages such as LD, FBD, SFC, ST and IL and/or other languages using high-end industrial computers, low-end PLC and/or IED controllers, and/or other computing devices. A development environment provides a user-friendly interface for developing the logic and/or downloading the logic to PLCs and/or IEDs. The environment provides a comprehensive work space, for generating logic without accessing any soft PLC product, with a framework that integrates low-end soft PLC technology and high-end GUI tools.

Figure 1:
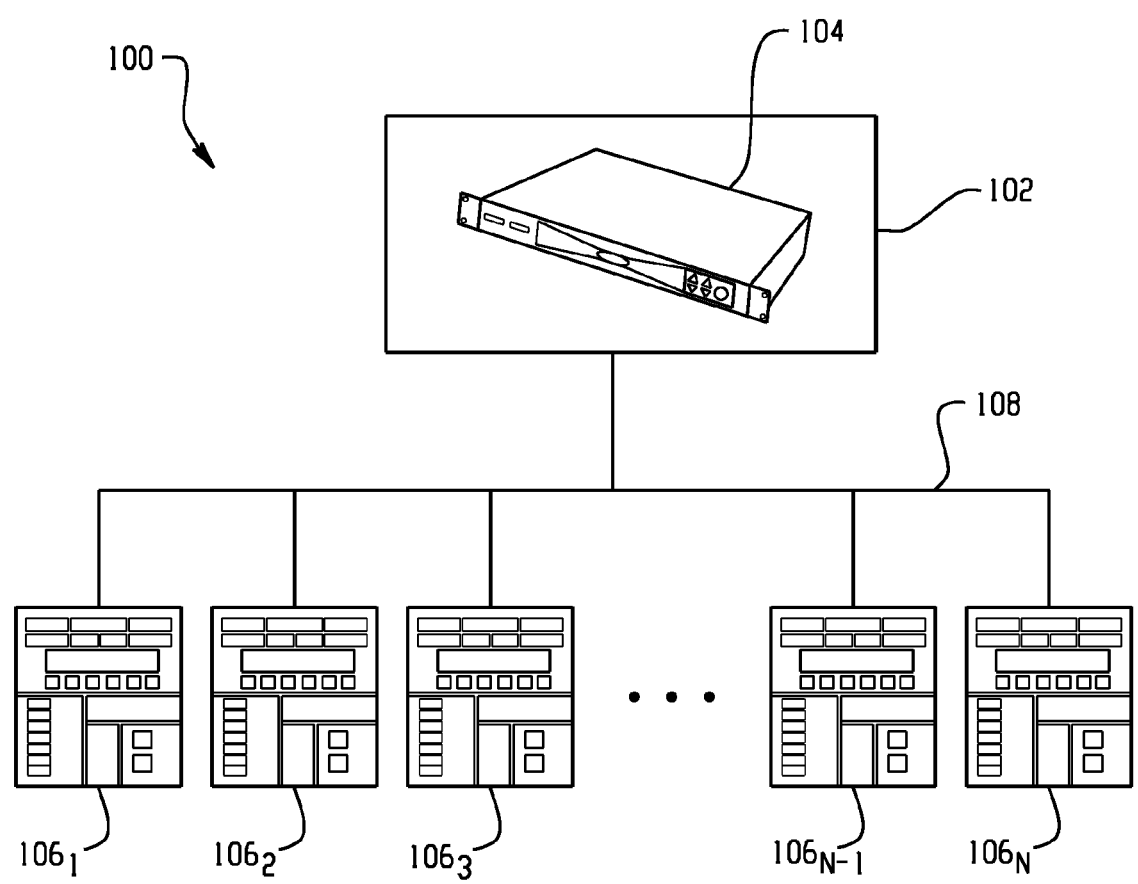
FIG. 1 illustrates an example centralized feeder automation system.

Initially referring to FIG. 1, a portion of an example centralized feeder automation system 100 for an electric power distribution system is illustrated. The centralized feeder automation system 100 includes at least one substation 102 with a master controller 104. As briefly noted above, the feeder automation logic executed by the master controller 104 can be developed in a soft PLC software environment based on the IEC 61131-3 standard PLC programming languages.

The centralized feeder automation system 100 also includes a plurality of slave IEDs $106_1$, $106_2$, $106_3$, ..., $106_{N-1}$, $106_N$, where N is an integer, along the electrical power distribution line. The slave IEDs $106_1$-$106_N$ are collectively referred to herein as IED 106. In this example, the slave IEDs 106 are associated with respective switches. In other examples, one or more of the slave IED 106 may be associated with one or more other assets of the electric power distribution system.

The master controller 104 communicates with the IED 106 over a network 108. In the illustrated example, such communication is through a PLC based protocol such as a serial communications protocol like Modbus and/or other protocol. In this example, the communication protocol is a TCP/IP protocol based on Ethernet. In other embodiments other communication protocols such as distributed network protocol (DNP), RP-570, Profibus, Conitel, IEC 60870-5-101 or 104, IEC 61850, etc. can alternatively be used.

As briefly noted above, the feeder automation logic executed by the master controller 104 allows for dynamic updates of the system configuration and the load profile and generation of fault resolution logic, based on a real-time system configuration and load profile, for fault location detection, fault isolation, and/or power restoration after the occurrence of a fault in the feeder network.

Figure 2:
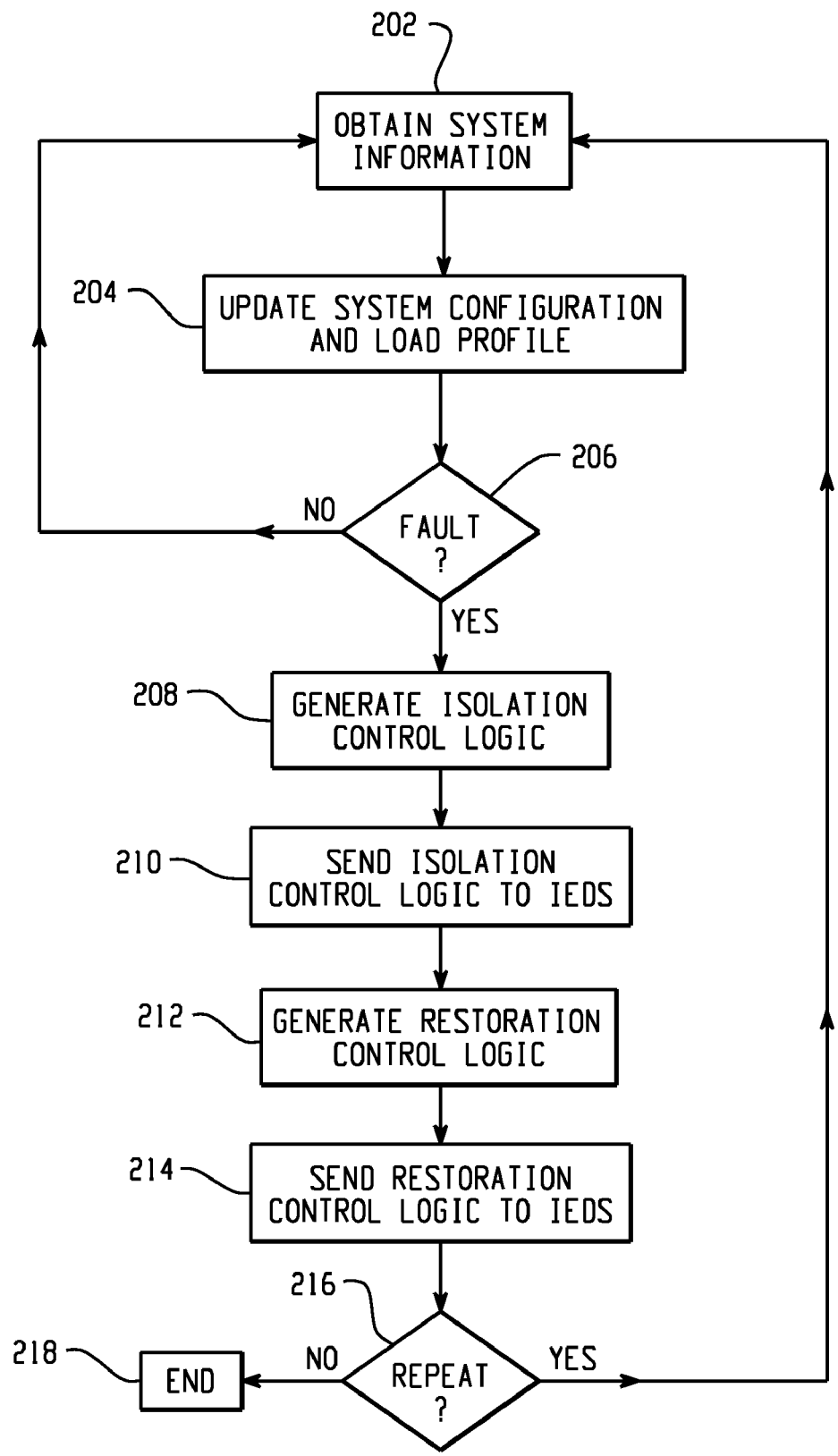
FIG. 2 illustrates an example feeder automation flow diagram.
Figure 3:
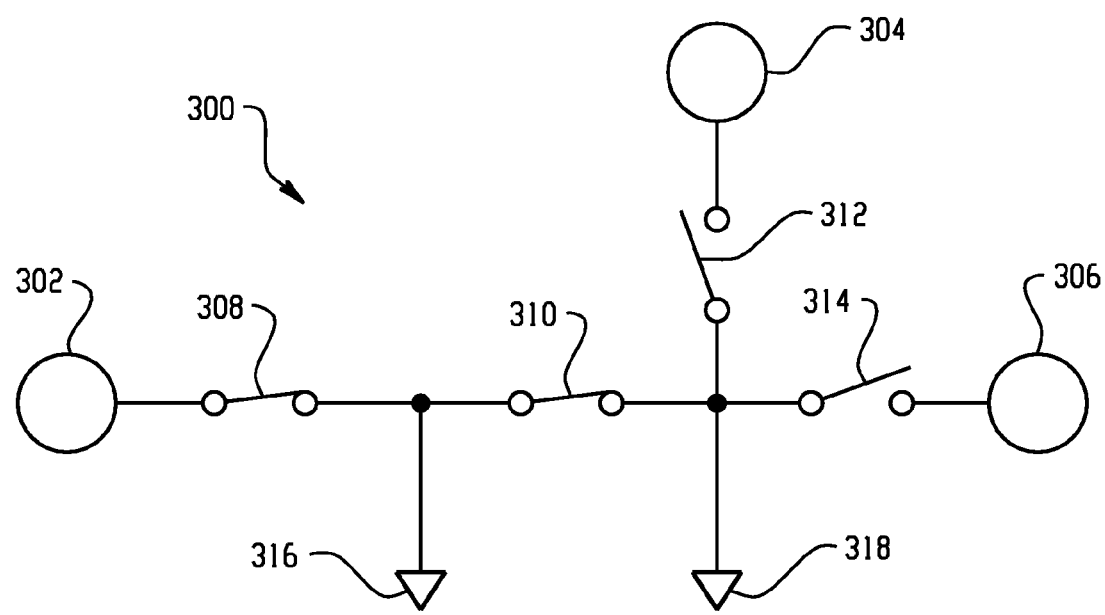
FIGS. 3-6 illustrate a feeder automation example.

Turning to FIG. 2, an example feeder automation flow diagram for the system 100 of FIG. 1 is illustrated. At 202, electric power distribution system information is obtained. In one instance, this may include one or more of polling one or more of the IED 106 for information, obtaining switch status (e.g., open, close, lockout) for one or more switches, determining a counter value for one or more reclosers, obtaining component electric characteristic such as an electrical current or voltage, and/or obtaining other information about the electric power distribution system.

At 204, the feeder system configuration and load profile are updated. As described in greater detail below, this may include updating a system incidence matrix and/or obtaining a system load profile. At 206, if there is no fault, acts 202 and 204 can be repeated. Otherwise, if there is a fault, then at 208 isolation control logic is generated. This may include identifying a fault location, isolation switches, etc. At 210, the isolation logic is sent to the IED 106. The isolation logic may result in selectively opening switches, for example, to isolate a faulty feeder section, etc.

At 212 restoration control logic is generated. This may include searching restoration sources, identifying restoration solutions, for example, based on capacity checks, etc. At 214, the restoration logic is sent to the IED 106. The restoration logic may result in selectively opening and/or closing switches, for example, to implement power restoration. At 216, if it is determined that the acts 202 to 214 are to be repeated, then flow goes back to 202. If it is determined otherwise, then at 218 flow ends.

FIGS. 3-6 illustrate an example based on the flow diagram of FIG. 2. Initially referring to FIG. 3, a feeder system 300 includes three (3) substations 302 (SB1), 304 (SB2) and 306 (SB3), four (4) switches 308 (SW1), 310 (SW2), 312 (SW3 and 314 (SW4), and two (2) loads 316 (L1) and 318 (L2). In this example, under normal operating conditions, the switches SW1 and SW2 are normally closed, the substation SB1 supplies power to the loads L1 and L2, and the switches SW3 and SW4 are normally open tie-switches. A master controller such as the master controller 104 monitors the system 300 for faults.

Figure 4:
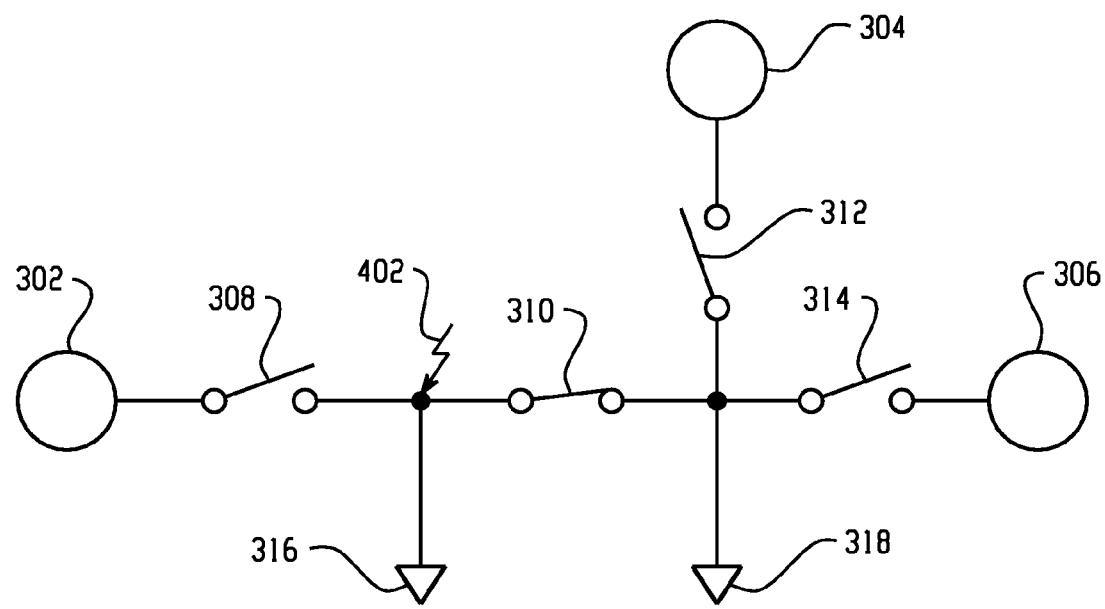
Figure 5:
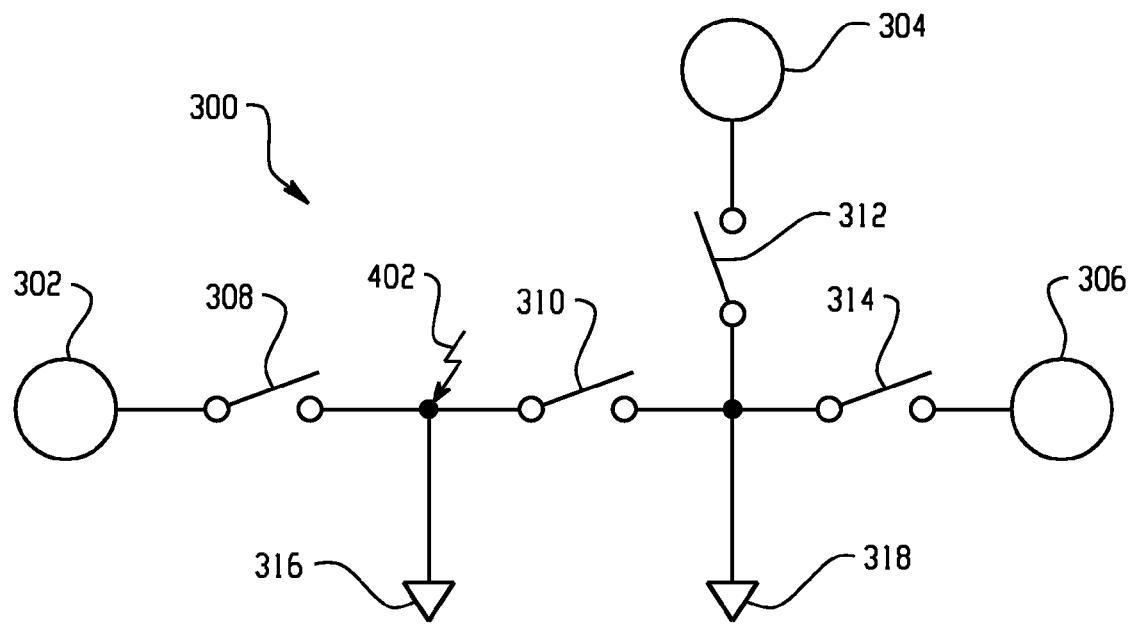

FIG. 4 illustrates the feeder system 300 with a fault 402 at the load 316. In response to the fault 402, the first switch 308 transitions to a lockout state after a reclosing sequence. The master controller 104 identifies the fault 402, including the fault location identification, based on the lockout. Once identified, the master controller 104 generates isolation control logic, which identifies the second switch 310 as the isolation switch to be opened to isolate the fault 402. The master controller 104 sends the isolation logic to second switch 310, and the second switch 310 is opened, as shown in FIG. 5.

Figure 6:
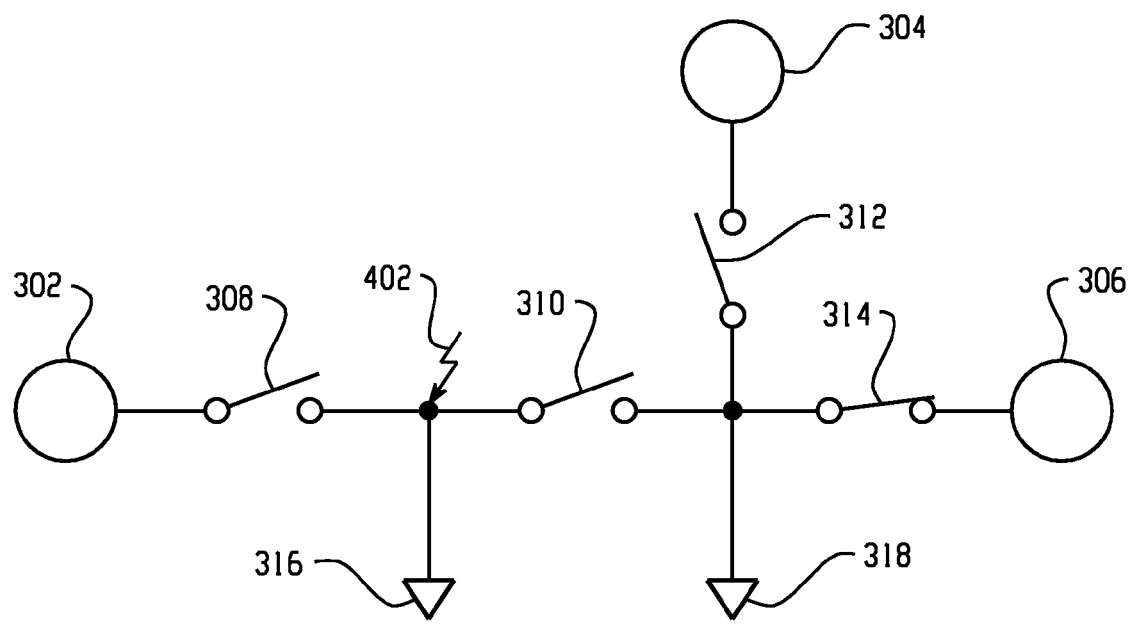

The master controller 104 also generates power restoration logic. Capacity and/or other checks are performed to identify the restoration sources, second and third substations 304 and 306. In this example, the third substation 306 is selected as the restoration source since the substation 306 has a larger capacity margin than the second substation 304. After the fault isolation action is confirmed, the master controller 104 sends the restoration logic to the third switch 314, and the third switch 314 is closed to provide a restoration path from the third substation 306 to the second load 318. This is shown in FIG. 6.

Figure 7:
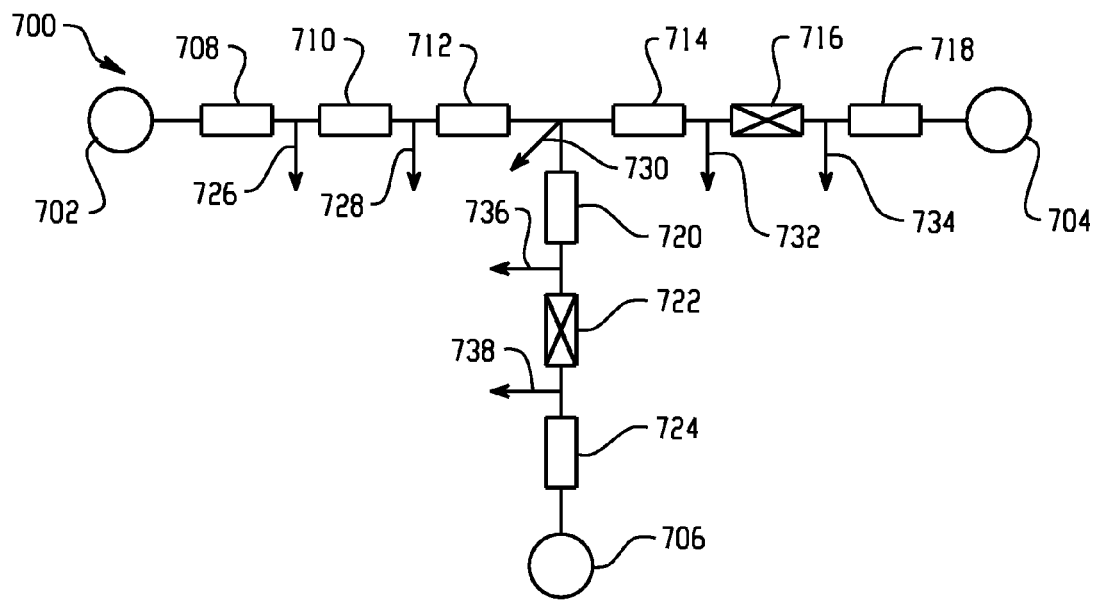
FIGS. 7 and 10-11 illustrate another feeder automation example.
Figure 10:
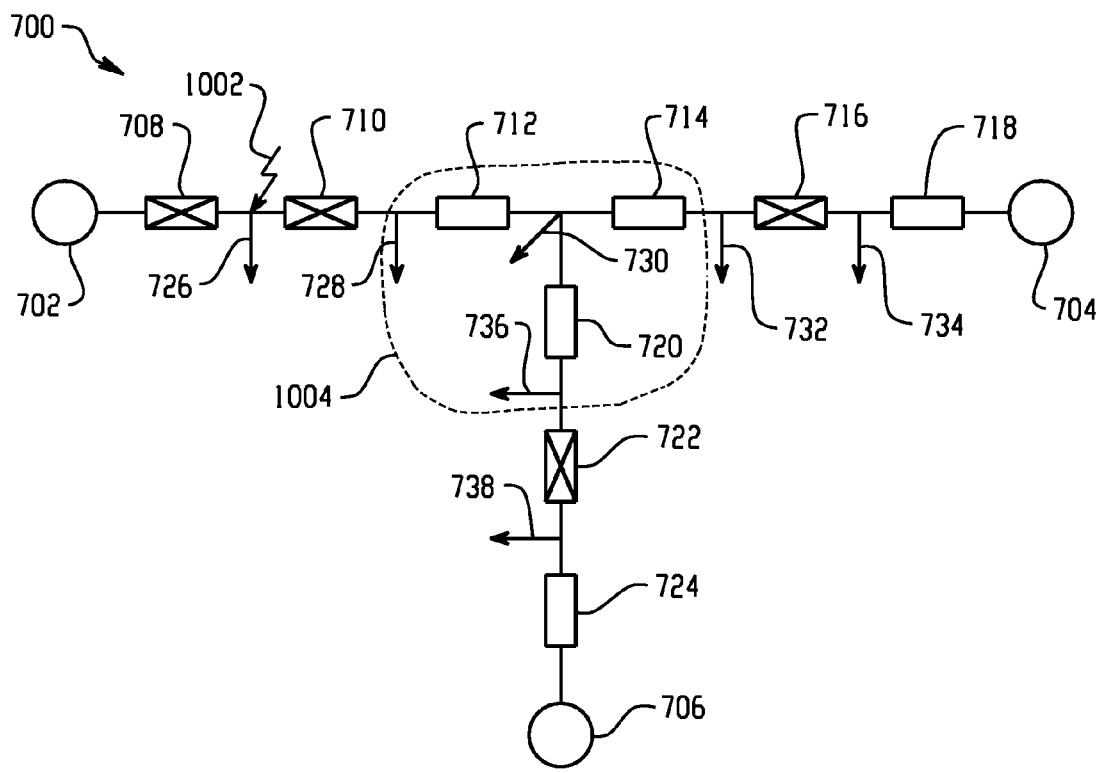
Figure 11:
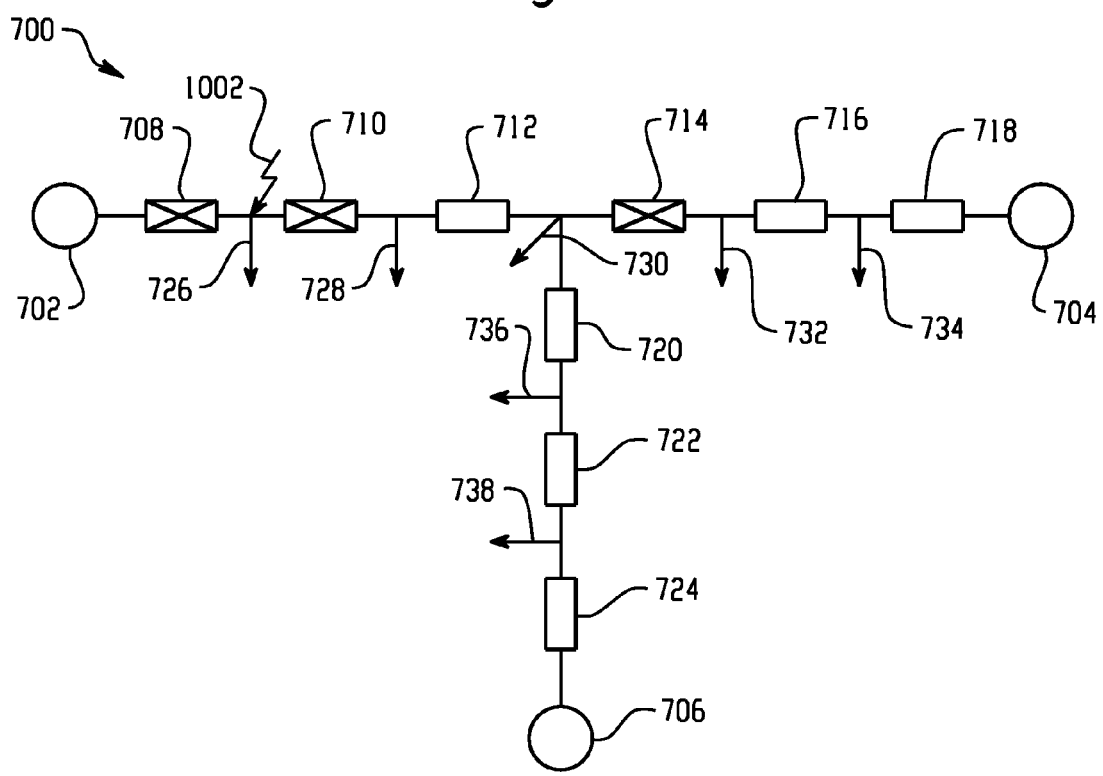

FIGS. 7 and 10-11 illustrates another example employing the flow diagram of FIG. 2. FIG. 7 shows an example feeder system 700, which respectively includes first, second and third substations 702, 704 and 706, a master controller 104 (FIG. 1) located in one of the three substations, first through ninth switches 708, 710, 712, 714, 716, 718, 720, 722 and 724 of the slave IED 106 (FIG. 1), and seven loads 726, 728, 730, 732, 734, 736 and 738.

In the normal operating condition, the first substation 702 supplies energy to loads 726, 728, 730, 732 and 736, the second substation 704 supplies energy to load 734, and the third substation 706 supplies energy to load 738. The switches 716 and 722 are normally open tie switches that maintain the radial configuration of the feeder system 700, and the switches 708-714, 718, 720 and 724 are normally closed.

With respect to act 202 of FIG. 2, obtaining system information, the Modbus TCP/IP library of the soft PLC environment can be used to establish communication between the master controller 104 and one or more of the slave IED 106. Such system information can include the switch status (e.g., open, close, or lockout), reclosing counter values, load information (e.g., in terms of current magnitudes flowing through the switches) and/or other information.

With respect to act 204 of FIG. 2, updating the system configuration, the feeder system topology can be represented in the logic with a system connectivity matrix, which includes the component connection relationship. An example connectivity matrix is illustrated in Equation (1):

Load / Substation Node s $$\begin{matrix} & 726 & 728 & 730 & 732 & 734 & 736 & 738 & 702 & 704 & 706 & \\ \begin{bmatrix} 1 & 0 & 0 & 0 & 0 & 0 & 0 & 1 & 0 & 0 \\ 1 & 1 & 0 & 0 & 0 & 0 & 0 & 0 & 0 & 0 \\ 0 & 1 & 1 & 0 & 0 & 0 & 0 & 0 & 0 & 0 \\ 0 & 0 & 1 & 1 & 0 & 0 & 0 & 0 & 0 & 0 \\ 0 & 0 & 0 & 1 & 1 & 0 & 0 & 0 & 0 & 0 \\ 0 & 0 & 0 & 0 & 1 & 0 & 0 & 0 & 1 & 0 \\ 0 & 0 & 1 & 0 & 0 & 1 & 0 & 0 & 0 & 0 \\ 0 & 0 & 0 & 0 & 0 & 1 & 1 & 0 & 0 & 0 \\ 0 & 0 & 0 & 0 & 0 & 0 & 1 & 0 & 0 & 1 \end{bmatrix} & \begin{matrix} 708 \\ 710 \\ 712 \\ 714 \\ 716 \\ 718 \\ 720 \\ 722 \\ 724 \end{matrix} \end{matrix}$$ Switches (1)

wherein the rows respectively represent the switches and the columns represent the load and the substation nodes. In the matrix of Equation 1, if a switch is connected to a node, the corresponding entry is one (1). Otherwise, the entry is zero (0).

Note that the above connectivity matrix does not include the system component upstream and downstream relationship. Such a relationship may change as a switch status changes. For example, a change in the system configuration may change a relative upstream and downstream relationship among the components.

To reflect such system configuration information, a system incidence matrix is dynamically generated based on both the connectivity matrix and the real-time system switch status. Specifically, any entry corresponding to an upstream node is represented by positive one (1), and any entry corresponding to a downstream node is represented by negative one (−1). An example incidence matrix is illustrated in Equation (2):

Load / Substation Nodes $$\begin{matrix} & 726 & 728 & 730 & 732 & 734 & 736 & 738 & 702 & 704 & 706 & \\ \begin{bmatrix} -1 & 0 & 0 & 0 & 0 & 0 & 0 & 1 & 0 & 0 \\ 1 & -1 & 0 & 0 & 0 & 0 & 0 & 0 & 0 & 0 \\ 0 & 1 & -1 & 0 & 0 & 0 & 0 & 0 & 0 & 0 \\ 0 & 0 & 1 & -1 & 0 & 0 & 0 & 0 & 0 & 0 \\ 0 & 0 & 0 & 1 & 1 & 0 & 0 & 0 & 0 & 0 \\ 0 & 0 & 0 & 0 & 1 & 0 & 0 & 0 & 1 & 0 \\ 0 & 0 & 1 & 0 & 0 & -1 & 0 & 0 & 0 & 0 \\ 0 & 0 & 0 & 0 & 0 & 1 & 1 & 0 & 0 & 0 \\ 0 & 0 & 0 & 0 & 0 & 0 & -1 & 0 & 0 & 1 \end{bmatrix} & \begin{matrix} 708 \\ 710 \\ 712 \\ 714 \\ 716 \\ 718 \\ 720 \\ 722 \\ 724 \end{matrix} \end{matrix}$$ Switches (2)

wherein the rows respectively represent the switches and the columns represent the load and the substation nodes.

The generation of such the incidence matrix can be done based on a "depth-first" search approach. Generally, such a search includes searching all nested substations connected through open/closed switches first. The stack based depth-first search can be performed without complex vector and/or matrix operations, and can be used to efficiently update the dynamic incidence matrix.

Figure 8:
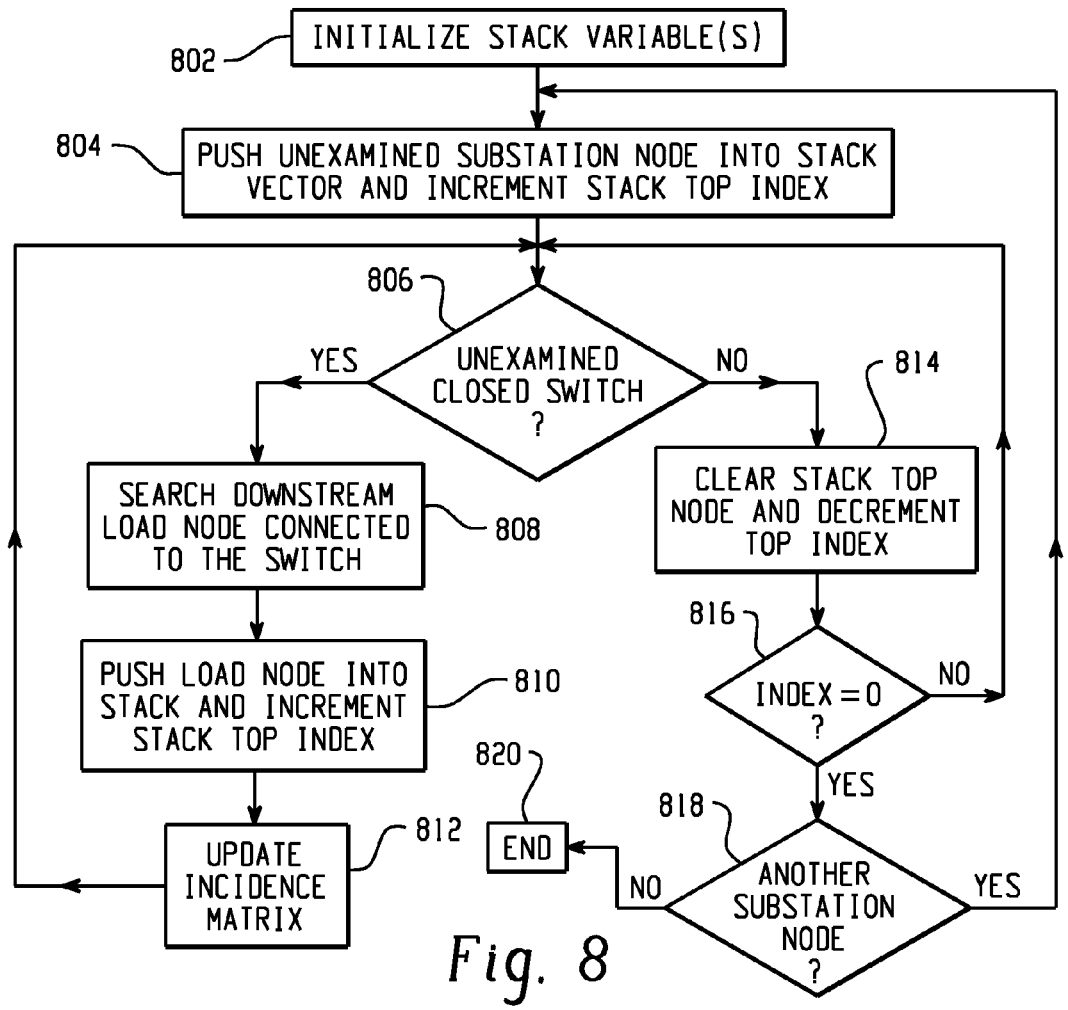
FIG. 8 depicts an example depth-first search flow diagram for determining an incidence matrix.

FIG. 8 depicts a flow diagram illustrating an example depth-first search which uses a stack vector and a heuristic search. At 802, one or more stack variables are initialized. Examples of such variables include, but are not limited to, a stack vector and a stack top index. In one instance, such variables are initialized to zero or another known value. At

804, an unexamined substation node is pushed into the stack vector, and the stack top index is incremented by one (1).

At 806, if there is an unexamined closed switch connected to a substation or a load node, then at 808, a downstream load node connected to the switch is searched. At 810, the load node is pushed to the stack, and the stack top index is incremented by one (1). At 812, a corresponding incidence matrix entry or cell is changed from positive one (1) to negative one (−1). Acts 808 to 812 are repeated until no more closed switches can be found.

Once it is determined at 806 that there are no more unexamined closed switches, then at 814 the stack top node is cleared ("popped out") and the stack top index is decremented or reduced by one (1). At 816, if the stack top index is not zero (i.e., the stack is not empty), then acts 806 to 814 are repeated, for example, until the stack is empty and/or otherwise. If the stack top index is zero and at 818 it is determined that another unexamined Substation exists, then acts 806 to 816 are repeated, for example, until all the substations are examined. Once the no more unexamined substations are found, the search ends at 820.

Figure 9:
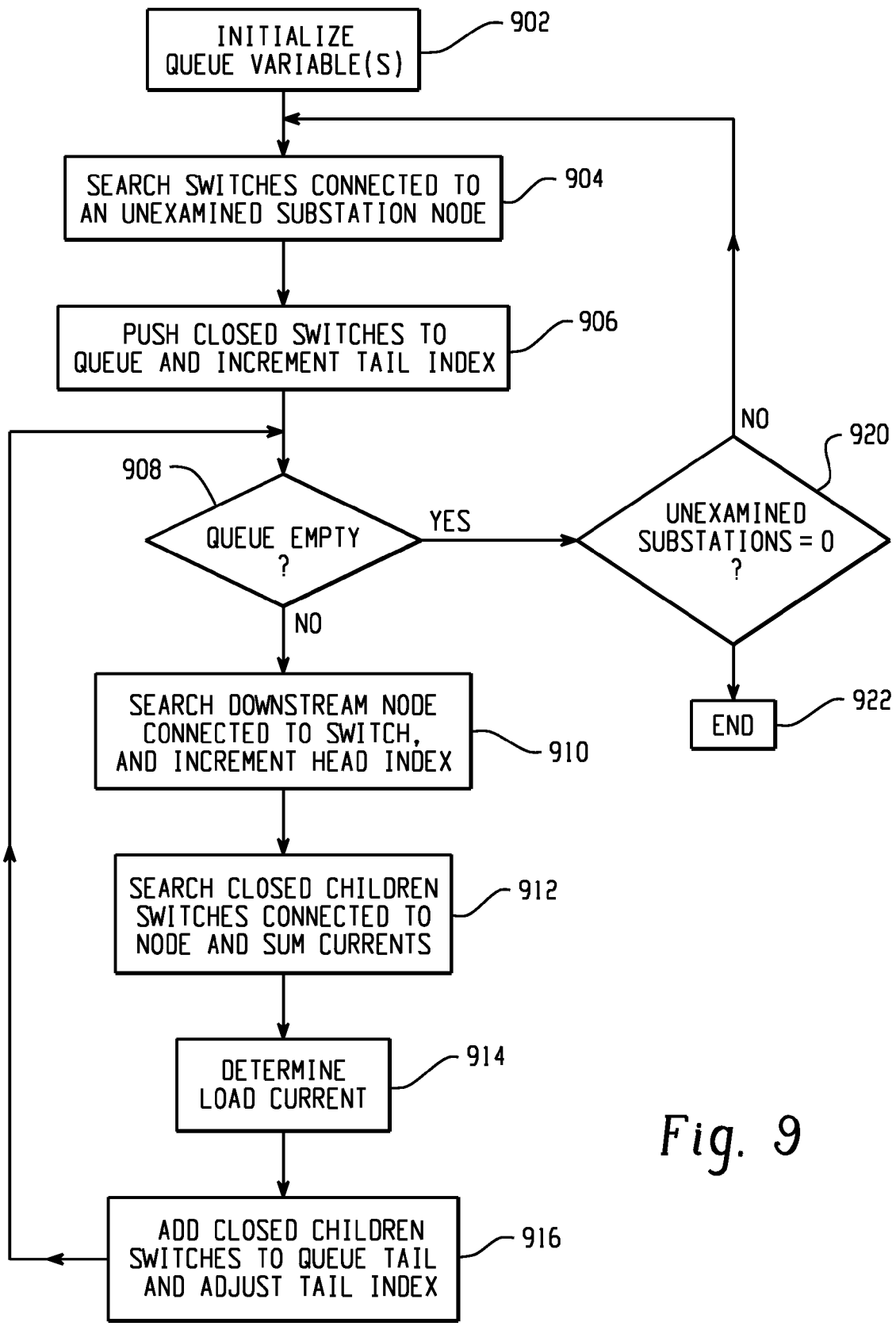
FIG. 9 depicts an example breadth-first search flow diagram for determining a load current.

Returning to FIG. 7, a load 726-738 in the feeder system 700 can be represented in terms of the load current magnitude, which can be calculated from the measured switch current magnitude using a "breadth-first" search. This can be generalized to calculate the load represented by real/reactive power based on the real/reactive power measurements from the IED 106. FIG. 9 depicts a flow diagram illustrating an example breadth-first search.

At 902, one or more queue variables are initialized. Examples of such variables include, but are not limited to, a queue vector, a queue head, and a queue tail. In one instance, such variables are initialized to zero (0) or another known value. At 904, switches connected to an unexamined substation node are searched. At 906, closed switches connected to this node are pushed into the queue, and the queue tail index is incremented.

If it is determined at 908 that the queue is not empty, then at 910 a downstream load node that is connected to the switch at the queue head is searched, and the queue head index is incremented by one (1). At 912, the closed children switches connected to this load node are searched, and the currents flowing through these closed switches are summed. At 914, a load current of the downstream load is determined. In one instance, the load current is set equal to a difference between the electrical current of the switch at the queue head and the summed currents.

At 916, any closed children switches are added to the queue tail and the queue tail index is adjusted accordingly. Acts 908 to 916 are repeated, for example, until the queue head index is the same as the queue tail index (i.e., the queue is empty) and/or otherwise. If it is determined at 908 that the queue is empty, then at 920, it is determined whether a set of substations to be examined have been examined. If not, then acts 904 to 920 are repeated until all the substations have been examined. If so, then the process ends at 922.

Returning to FIG. 7, for explanatory purposes, example IED measurements of the switch current magnitudes for the system 700 are shown in Table 1 and example loads, in terms of current magnitudes obtained from the dynamic load profile update algorithm, are shown in Table 2.

TABLE 1

IED Electrical Current Measurements.

| | Switch No. | | | | | | | |
|---|---|---|---|---|---|---|---|---|
| | 708 | 710 | 712 | 714 | 716 | 718 | 720 | 722 | 724 |
| Current (Ampere) | 209 | 195 | 184 | 40 | 0 | 90 | 70 | 0 | 50 |

TABLE 2

Load Electrical Current Magnitudes.

| | Load No. | | | | | | |
|---|---|---|---|---|---|---|---|
| | 726 | 728 | 730 | 732 | 734 | 736 | 738 |
| Current (Ampere) | 14 | 11 | 74 | 40 | 90 | 70 | 50 |

With respect to acts 206 and 208 of FIG. 2, once a fault occurs the master controller 104 identifies the location of the fault and generates isolation logic. FIG. 10 illustrates the feeder system 700 with a fault 1002 at the load 726. In one instance, the fault location identification and fault isolation logic are generated automatically based on the incidence matrix by searching downstream of a lockout switch and comparing the reclosing counter values before and after the fault.

By way of example, when the fault 1002 occurs, the upstream switch 708 can lockout to the open status after a reclosing sequence. Based on such switch lockout information and the increased reclosing counter values of this switch, the downstream load 726 of lockout switch 708 is identified as the fault location. In addition, the other switch connected to this node (switch 710) can also be identified and considered as the isolation switch that should be opened to isolate the faulty feeder section.

The search for the downstream node 726 and switch 710 of the lockout switch 708 (i.e., the fault location and the isolation switch) can be performed using the incidence matrix as shown bellow.

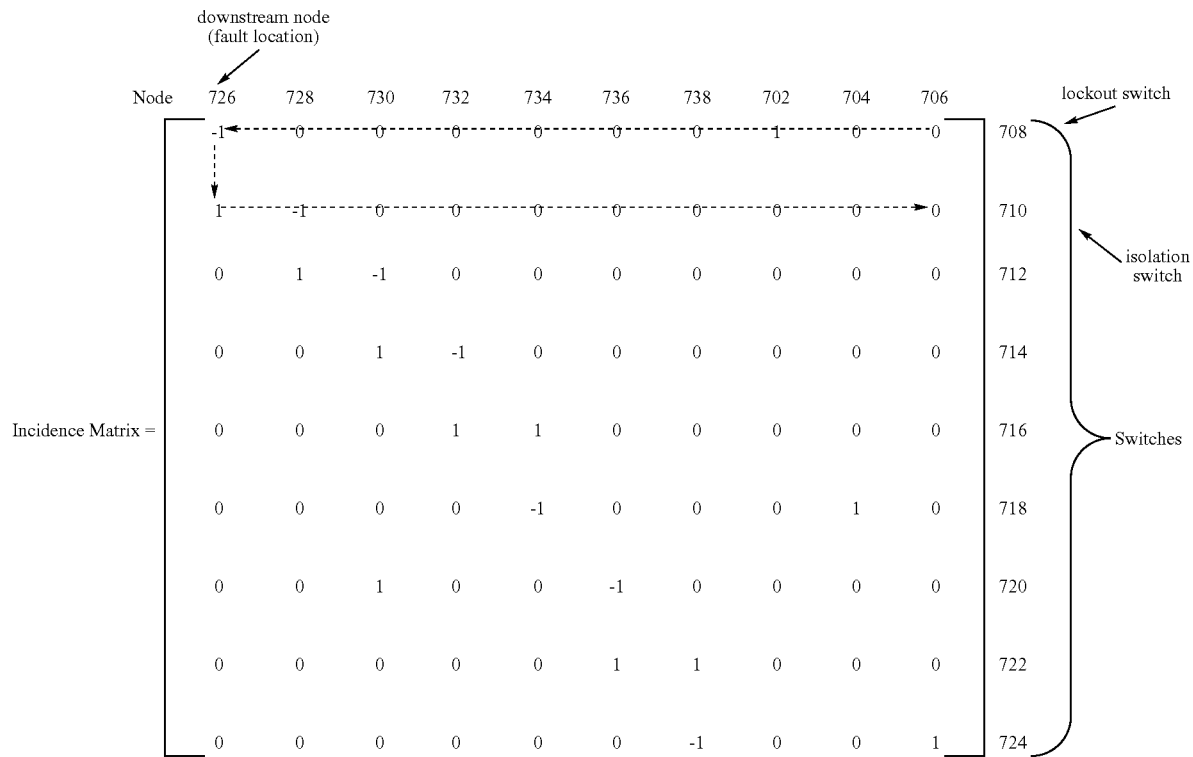

The post-isolation system configuration is shown in FIG. 10. As shown, loads 728, 730, 732, and 736 lose their power supply. The area in which these loads are located is referred to as the non-faulty out-of-service area 1004.

With respect to acts 212 and 214 of FIG. 2, once isolated the master controller 104 generates and forwards restoration logic. In one instance, this can be done automatically. For example, a depth-first search can be used to search for one or more possible restoration sources and paths, and a reverse search can be used to find the appropriate restoration paths based on restoring as much load as possible from multiple restoration substations (sources) and maintaining the load balance in each restoration path.

FIG. 11 shows an example of one possible power restoration algorithm. With this example, the search for power restoration sources starts from isolation switch 710. The downstream nodes and connected switches are searched and stored. The search terminates or stops at the normally open tie switches. In FIG. 11, the search stops at the two normally open tie switches 716 and 722, which leads to two possible restoration sources, the second substation 704 and the third substation 706.

Among the possible restoration sources, an equivalent capacity margin (ECM) of each source down to the normally open tie switches are calculated. For instance, after supplying the already existing loads, a minimum ECM of each source and its related switches before the normally open tie switch is obtained. Based on such ECM information, the restoration source/path that has the largest ECM will be considered first to restore load in the non-faulty out-of-service area 1004.

After picking up a certain amount of the load, the source/path may have less ECM than other sources/paths. Then, another restoration source/path that has the largest ECM will be considered instead to pick up the load. This procedure will repeat until the entire load in the non-faulty out-of-service area has been restored or all the restoration sources/paths have run out of their capacities. Power restoration path search based on this approach can restore as much of the load as possible and simultaneously balance the load to each restoration source/path in terms of its available capacity.

Note that only the capacity limits of sources and switches in the related path is considered in determining if additional load can be restored from a certain substation source/path. However, other or additional information can also be used. For example, operating constraints such as voltages and/or power flows can alternatively or additionally considered, for example, similarly as the source and switch capacity limits in determining the restoration source/path.

When a joint node that connects to more than one restoration source/path is encountered, the restoration source/path that has the highest ECM may be selected to continue the restoration procedure for loads at the joint node and beyond it. Other restoration sources/paths may stop power restoration to load before the joint node. The choice of the source/path with the highest ECM to continue the load restoration at and beyond the joint node may allow power to be restored to as much of the load as possible.

For the example of FIG. 11, the capacity limits of the substations 704 and 706 and the switches are three hundred (300) amperes. Based on the possible restoration source/path obtained from stage 1, the ECM of the second substation 704 down to switch 716 is two hundred and ten (210) amperes, and the ECM of the third substation 706 down to switch 722 is two hundred and fifty (250) amperes. After the capacity check, both of the restoration sources are able to pick up one more the load 732 and 736 in their respective paths, i.e., the switches 714 and 720 are assumed to be opened, and the switches 716 and 722 are assumed to be closed for the first and second substations 704 and 706 to pick up the loads 732 and 736.

After the restoration of the loads 732 and 736, the ECMs of the two restoration sources 704 and 706 become one hundred and seventy (170) amperes from the second substation 704 and one hundred and eighty (180) amperes from the third substation 706. As the restoration path from the third substation 706 has a higher ECM compared with the second substation 704 and the capacity check of this path shows it has enough capacity to pick both loads 728 and 730, the third substation 706 is selected to continually restore the load at the joint load 730 and the load 728. Therefore, the restoration includes opening the switch 714 and closing the switches 716 and 722, wherein the loads 728, 730 and 736 are restored from the third substation 706, and the load 732 is restored from the second substation 704. The loads are balanced to the largest extent to the two restoration sources/paths.

Figure 12:
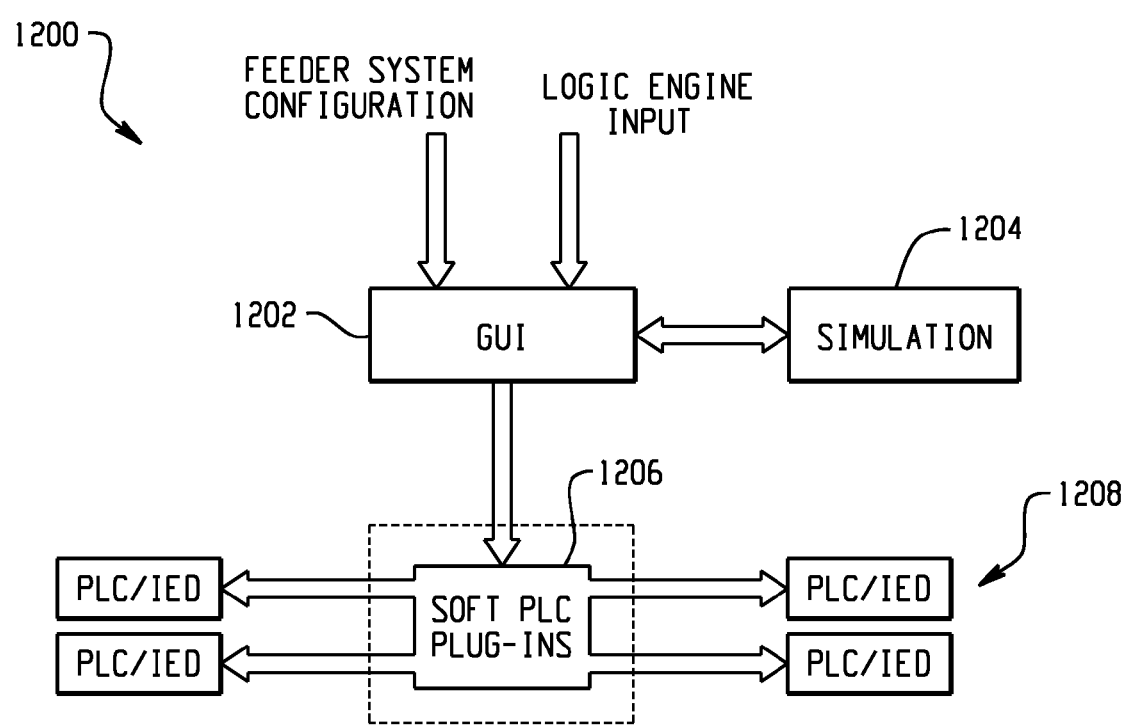
FIGS. 12-17 illustrate an example environment for generating feeder automation logic.

FIGS. 12-16 illustrate an example development environment for generating feeder automation logic described herein. FIG. 12 depicts an example infrastructure 1200. In one instance, the infrastructure 1200 allows low-end soft PLC technology to be integrated with the high-end constituents. For example, low-end soft PLC technology can be integrated with a high-end graphical user interface 1202, a high-end simulation module 1204, both of which can be based on an advanced programming language, and one or more soft PLC plug-ins 1206 that integrate various soft PLC products such as PLCs/IEDs 1208 with the high-end constituents 1202, 1204.

The GUI 1202 allows, among other things, a user to input the system topology and configure system components, and develop PLC language-based feeder automation logic. By allowing a user to develop logic in the GUI 1202, the user does not have to access soft PLC software that runs in the back stage. As such, soft PLC software becomes transparent or invisible to the user, and user does not need to be familiar with a soft PLC software programming environment to develop the logic. The simulation module 1204 allows the user to simulate feeder automation functions under different system operating conditions and/or verify the logic before the user provides the logic to the soft PLC plug-ins 1206.

The soft PLC plug-ins 1206 allows the user to transfer the user interface information to soft PLC products, which enables the use of different soft PLC products in the feeder automation application and eliminates the limit to tie the feeder automation solution to a particular soft PLC product. Based on the information obtained from the user interface, each soft PLC plug-in component (corresponding to a soft PLC product) can generate the soft PLC projects for feeder automation applications and download such projects to PLCs or IEDs 1208. This framework has an open structure design and can accommodate multiple soft PLC plug-in components.

Figure 13:
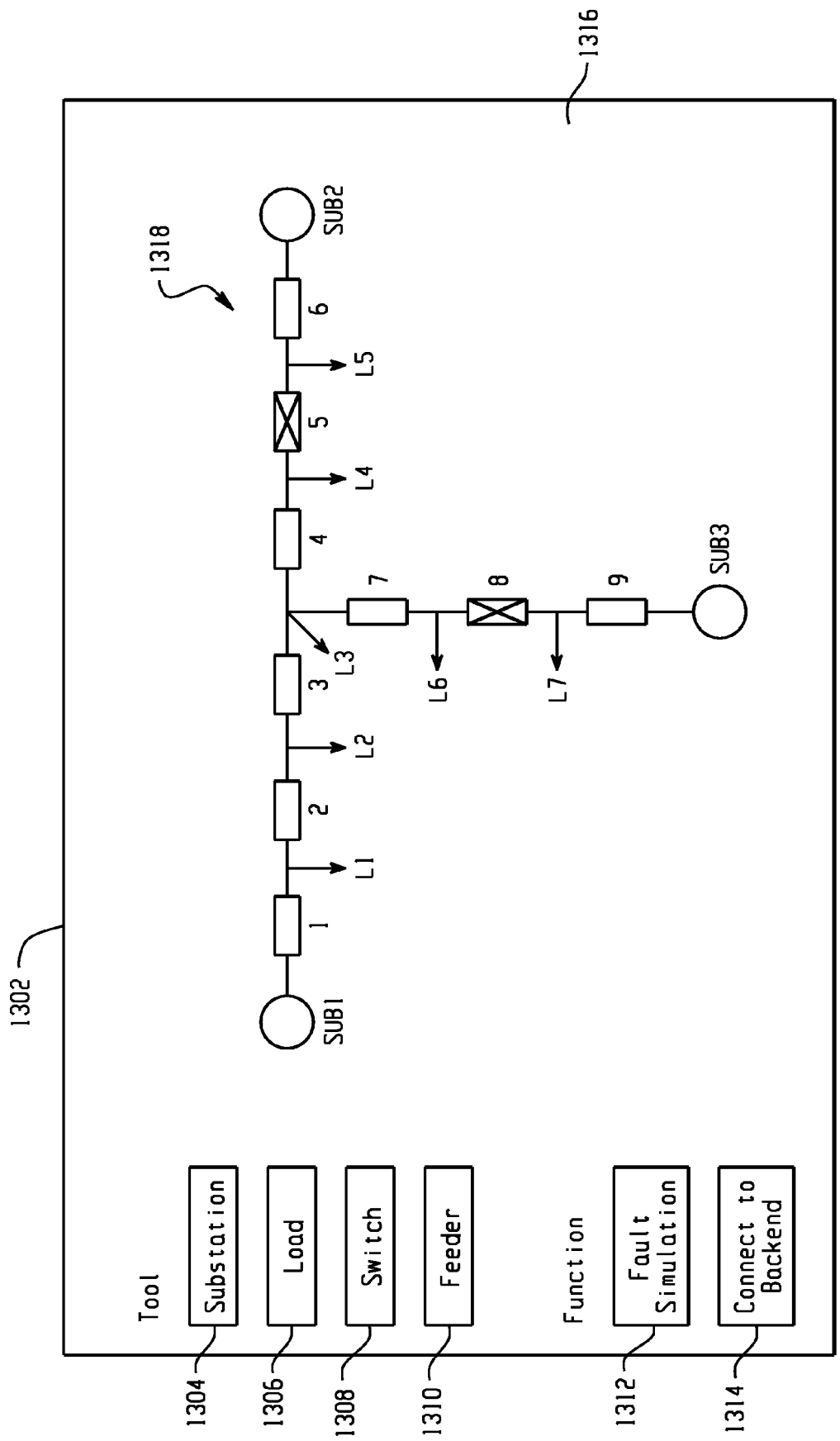
Figure 14:
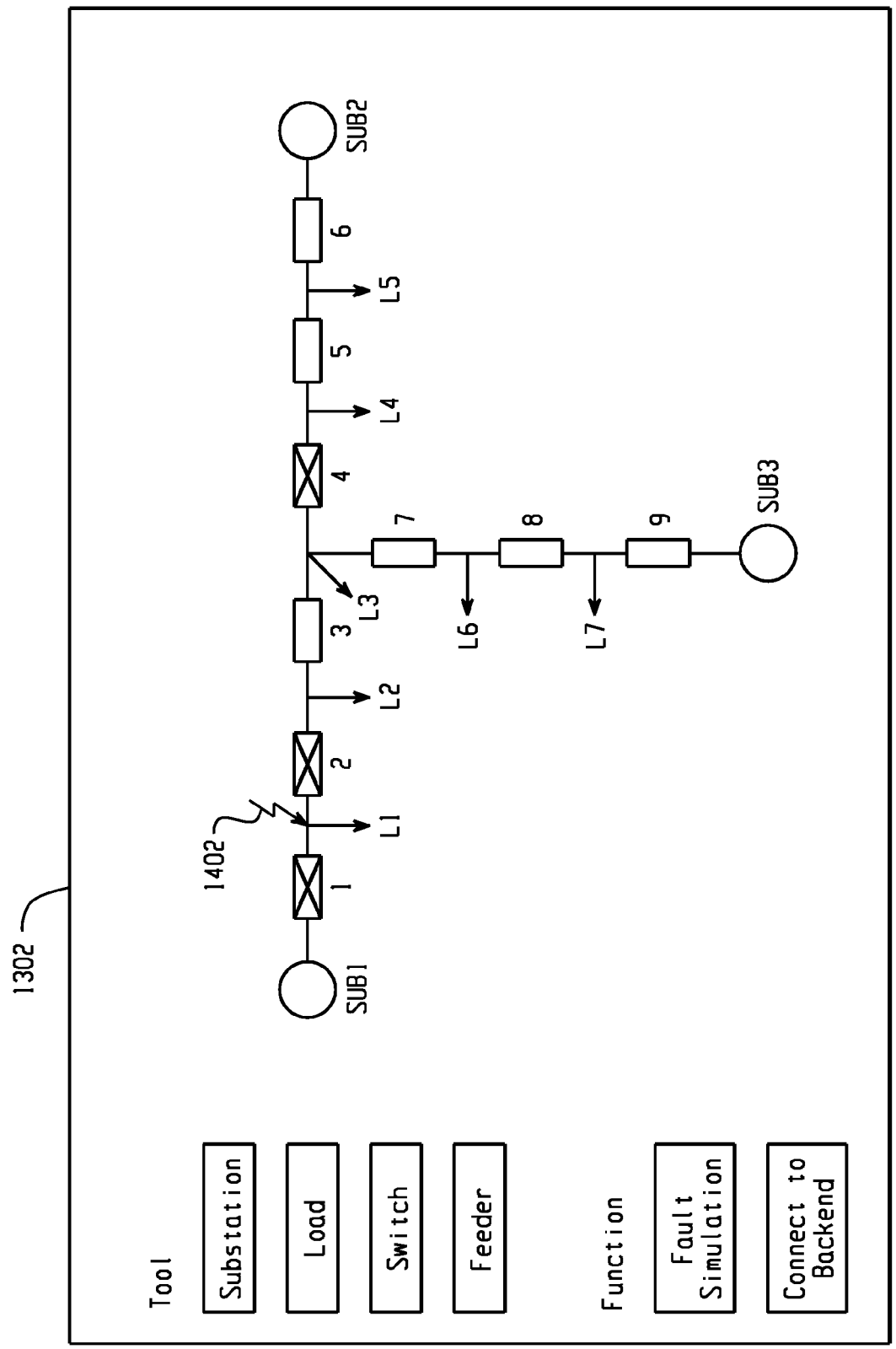

FIGS. 13 and 14 illustrate an example window 1302 of the GUI 1202 in which a user can input a feeder topology and/or configure system component parameters. In this example, the window 1302 includes various regions or buttons for activating functionality, such as at least a Substation button 1304, a Load button 1306, a Switch button 1308, a Feeder button 1310, a Fault Simulation button 1312, and a Connect to Backend button 1314. The window 1302 also includes a programming region 1316. An example feeder system 1318 is shown in the programming region 1316.

The user can simulate a fault situation, for example, by putting a fault label 1402 at a load node in the system as shown in FIG. 14. By pressing the Fault Simulation button 1312, the user can simulate the feeder automation logic under a fault condition and confirm the effectiveness of the generated logic. By pressing the Connect to Backend button 1314, the user can download the logic to a target(s).

By clicking on the load node, a Logic Engine window 1502 (FIG. 15) opens and allows the user to input logic in terms of IEC 61131-3 standard PLC programming languages such as function block diagram (FBD). An example FBD 1504 is shown for explanatory purposes. The Logic Engine window 1502 may provide a function block library for users to drag and drop function blocks to develop the logic engine. Moreover, based on the feeder system in the window 1302, the user can easily select system input and output variables for the logic engine.

Other pre-defined feeder automation logic can also be integrated with each soft PLC plug-in component. For example, for the fault simulation, the user can run the simulation using the pre-defined/default logic by activating a Default Logic button 1506. If the user is not satisfied with the results obtained from the pre-defined logic, the user can develop logic and activate a User Defined Logic button 1508. The environment is user configurable such that the user can set preferences, including assigning user defined logic with a higher priority than the pre-defined logic. When transferring logic to soft PLC plug-in components, the transferred logic will replace the pre-defined logic.

In one instance, the soft PLC plug-in 1206 is used as middleware to transfer user interface information to soft PLC products and generate corresponding soft PLC projects, which can be downloaded to low-end controllers using the soft PLC target support packages. This framework can be implemented using XML or other formats. For example, user interface information may be converted to XML format with the syntax that the corresponding soft PLC product can accept. The data can be wrapped in the XML format for different objects to create soft PLC projects.

The following provides an example of system information transfer using XML in the soft PLC plug-in 1206. With reference to FIG. 13, the system connectivity matrix can be extracted from the user interface 1302 to represent the system component connection information. As noted previously, the rows in the connectivity matrix correspond to the switches, and the columns correspond to the loads and the substations.

Figure 16:
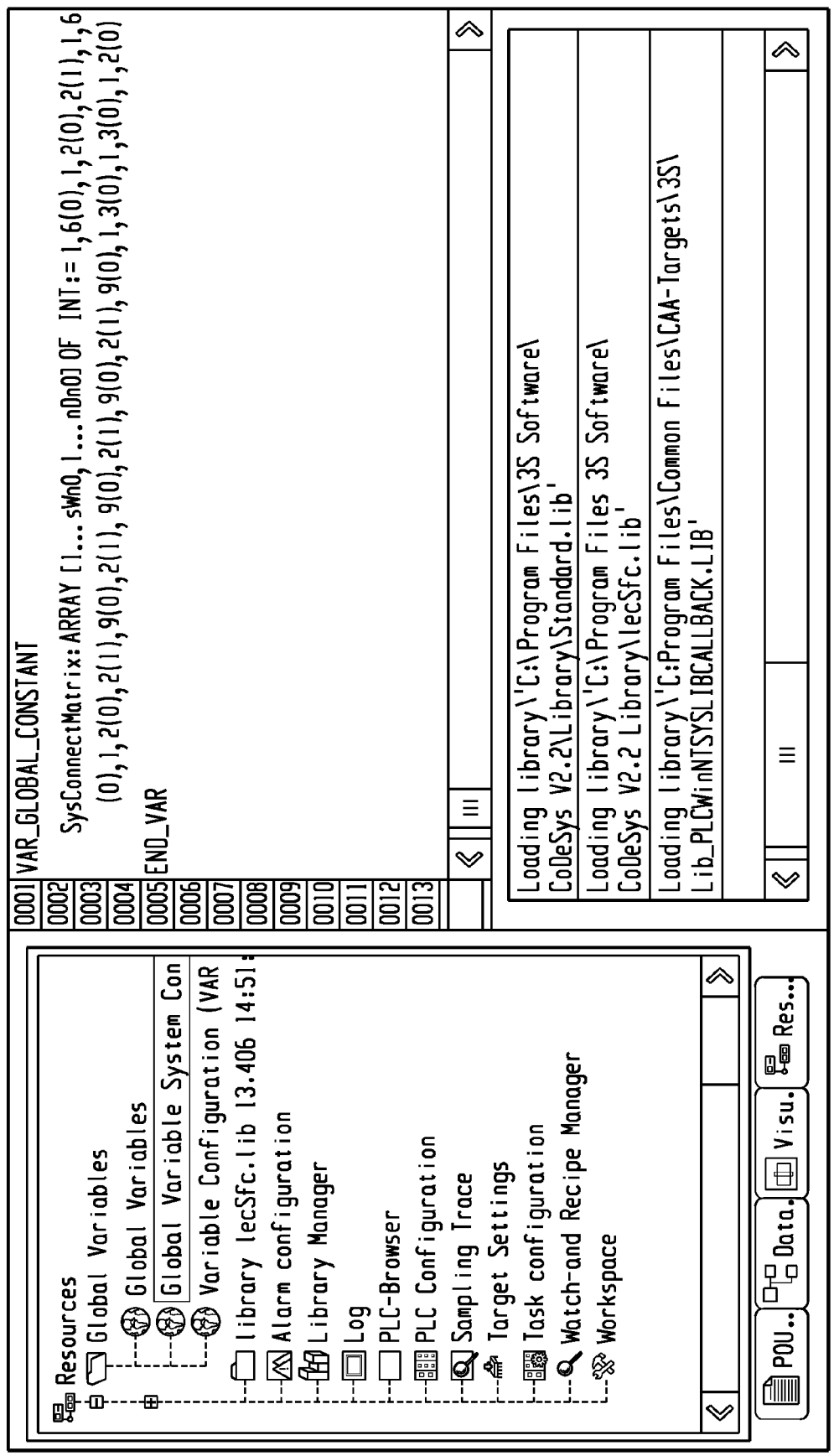

By using advanced programming tools, such connectivity matrix extracted from the user interface can be wrapped in the XML format with the syntax that a soft PLC product can accept as a project object. An example XML wrapping for the above matrix is shown below. An example object that includes the connectivity matrix in a soft PLC project is shown in FIG. 16.

```
<?xml version="1.0" encoding="ISO-8859-1"?>
<gvl>
    <path/>
    <name>Global_Variables_System_Constant</name>
    <flags>2048</flags>
    <interface>
        <![CDATA[VAR_GLOBAL CONSTANT
        SysConnectMatrix: ARRAY [1..SwNo, 1..NdNo] OF INT :=
        1, 6(0), 1, 2(0), 2(1), 9(0), 2(1), 9(0), 2(1), 9(0), 2(1), 9(0),
        1, 3(0), 1, 3(0), 1, 2(0), 1, 9(0), 2(1), 9(0), 1, 2(0), 1;
        END_VAR
        ]]>
    </interface>
    <file-name><![CDATA[ ]]></file-name>
    <file-time>0</file-time>
    <exp-imp>false</exp-imp>
</gvl>
```

Figure 15:
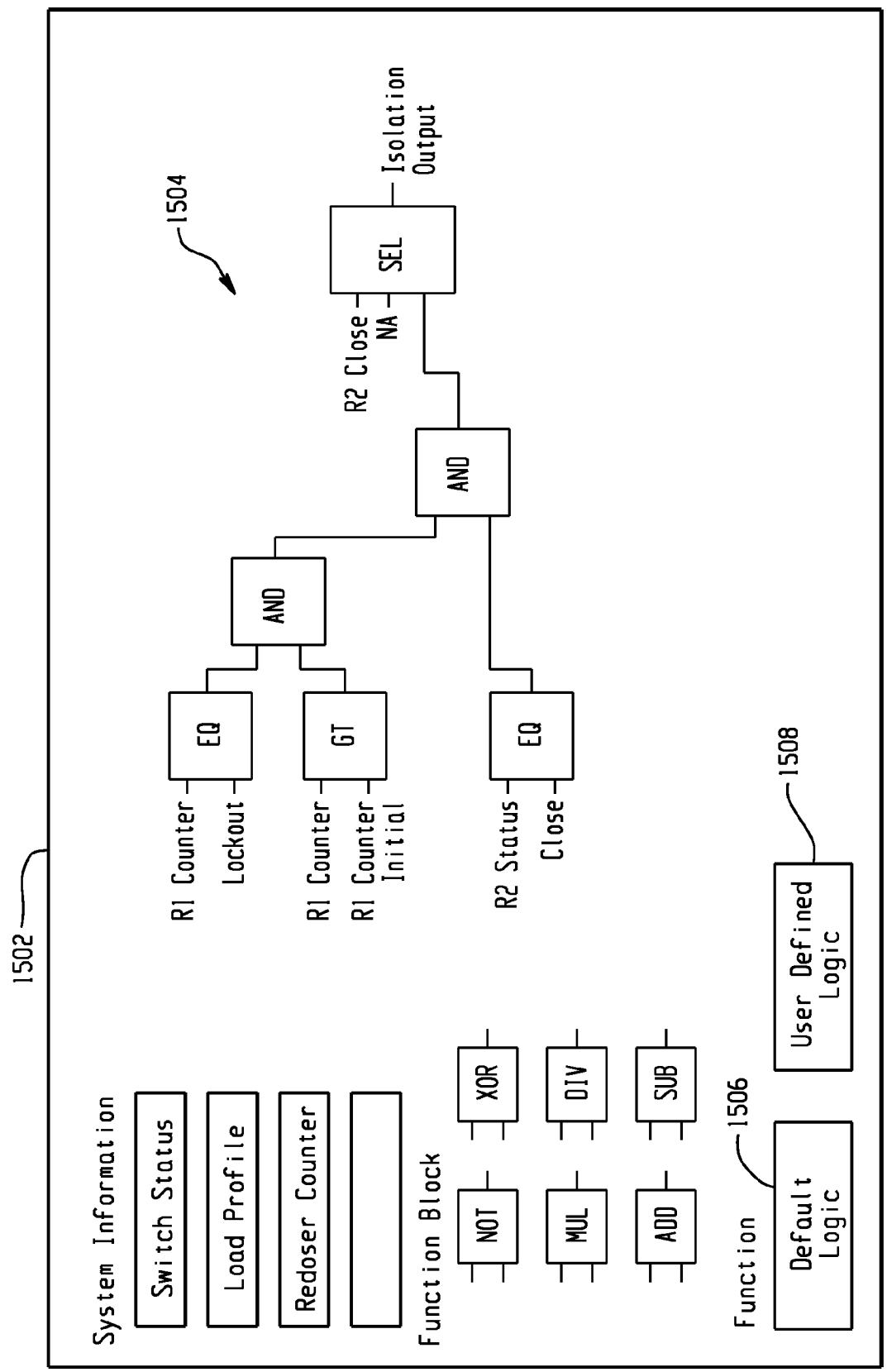
Figure 17:
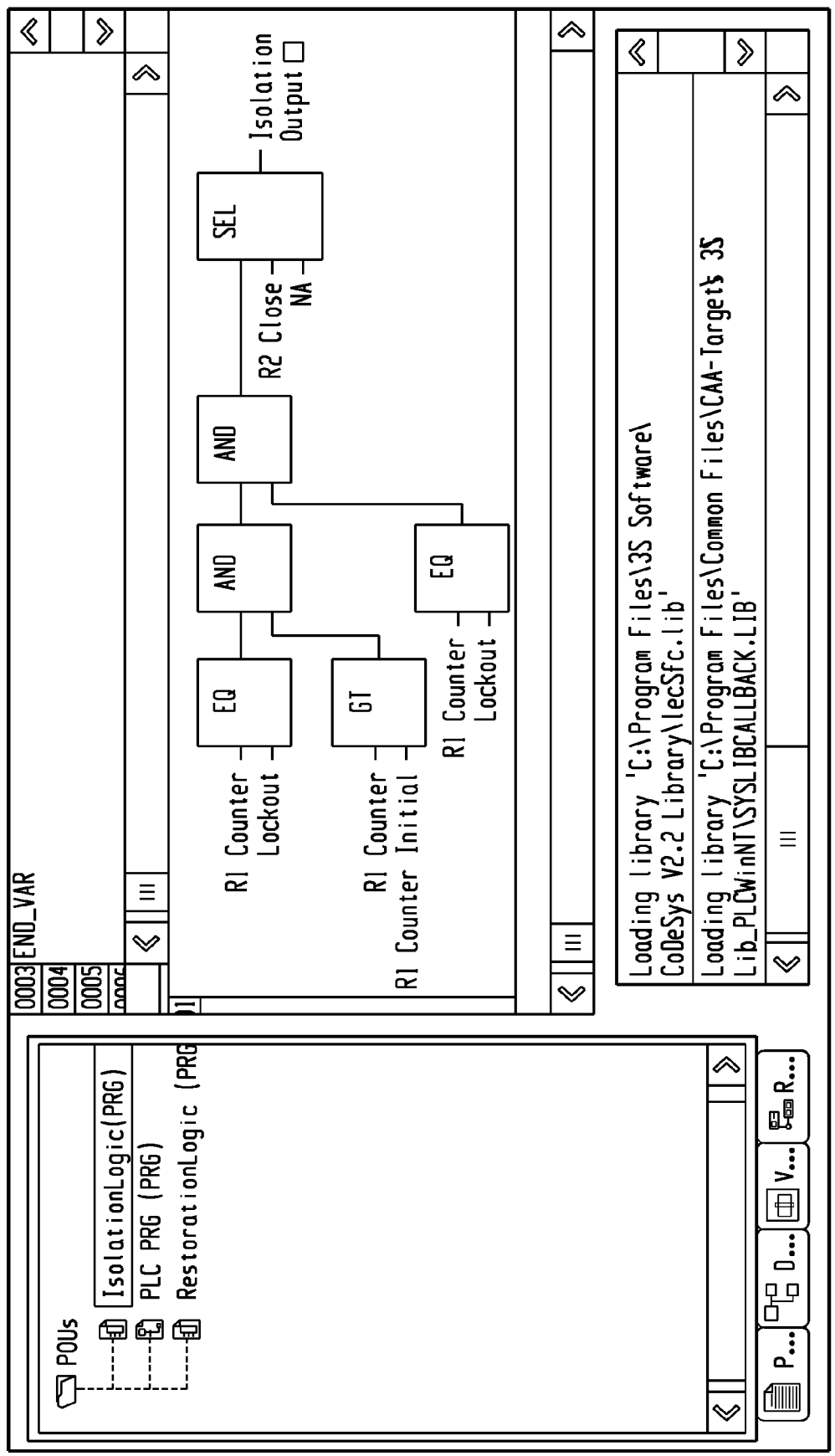

Another example is used to illustrate the transformation of the example isolation logic 1504 shown in FIG. 15 to a soft PLC object via the XML techniques. The logic 1504 can be packaged in the XML format as shown below. An example object that includes the logic is shown in FIG. 17.

```
<?xml version="1.0" encoding="ISO-8859-1"?>
<pou>
    <path/>
    <name>IsolationLogic</name>
    <flags>2048</flags>
    <interface>
        <![CDATA[PROGRAM IsolationLogic
VAR
END_VAR]]>
    </interface>
    <fbd>
        <network>
            <label><![CDATA[ ]]></label>
            <comment><![CDATA[ ]]></comment>
            <element type="assign">
                <element type="box">...</element>
                <output>
                    <flags>0</flags>
                    <name><![CDATA[Isolation Output]]></name>
                </output>
            </element>
        </network>
    </fbd>
</pou>
```

Similarly, other user interface information can be transferred to the soft PLC project as different objects. After obtaining all necessary objects, a soft PLC project is ready to be downloaded to targets. Based on the selected target platform, the appropriate target support package associated with a soft PLC product will be used to generate code that can run in the target.

For target PLCs, the generated code can be downloaded into PLCs directly. Regarding target intelligent electronic devices (IEDs), since they are usually configured through particular tools, such as the Protection and Control IED Manager (PCM), and the resulting configuration files is generally XML format compliant, XML techniques can be used to package the generated logic engine code so that the generated code can be integrated into the configuration file and accepted by the IED platform along with other configuration results.

The above may be implemented by way of computer readable instructions, which when executed by a computer processor(s), cause the processor(s) to carry out the described techniques. In such a case, the instructions are stored in a computer readable storage medium associated with or otherwise accessible to the relevant computer.

Of course, modifications and alterations will occur to others upon reading and understanding the preceding description. It is intended that the invention be construed as including all such modifications and alterations insofar as they come within the scope of the appended claims or the equivalents thereof.

What is claimed is:

1. A computer-implemented method, comprising:
   generating a connectivity matrix for an electric power distribution system based on a system topology;
   updating a system configuration incidence matrix for the electric power distribution system based on both a depth-first search of the connectivity matrix and information about the electric power distribution system, wherein the information includes at least status information about one or more switches of the electric power distribution system, wherein the updating comprises:
   (a) inserting indicia indicative of an unexamined substation node of the electric power distribution system in a stack vector and incrementing a stack topindex;
   (b) identifying an unexamined closed switch downstream from the substation node;
   (c) identifying an unexamined load node corresponding to the identified closed switch;
   (d) inserting indicia indicative of the identified load node in the stack vector and incrementing the stack top index;
   (e) inserting indicia indicative of a state of the identified load node in a corresponding cell in the incidence matrix; and
   (f) repeating (b)-(e) for all unexamined closed switches downstream from the substation node;
   detecting a fault in the electric power distribution system based on the incidence matrix;
   generating isolation control logic based on the incidence matrix;
   isolating the fault based on isolation control logic;
   generating restoration control logic based on a breadth-first search of the incidence matrix; and
   restoring the electric power distribution system based on the restoration control logic.

2. The computer-implemented method of claim 1, wherein the electric power distribution system includes one or more IEDs and one or more corresponding switches, and further including obtaining the status information about the one or more switches corresponding to the one or more IEDs.

3. The computer-implemented method of claim 1, wherein a computing system located in a substation of the electric power distribution system executes the computer-implemented method.

4. The computer-implemented method of claim 1, wherein the computer-implemented method is based on IEC 61131-3 standard PLC programming languages.

5. The computer-implemented method of claim 4, wherein the computer-implemented method is based on soft PLC technology.

6. The method of claim 5, wherein the soft PLC technology simulates feeder automation functions under different system operating conditions.

7. The method of claim 5, wherein the soft PLC technology validates the logic.

8. The method of claim 5, wherein the soft PLC technology includes at least one of a PLC or an IED.

9. The method of claim 5, wherein the soft PLC technology receives user input by using PLC language-based feeder automation input.

10. The method of claim 5, wherein the soft PLC technology includes one of at least LD, FBD, SFC, ST and IL.

11. The method of claim 5, wherein the soft PLC technology is transparent to the user.

12. The computer-implemented method of claim 1, wherein the incidence matrix is a two-dimensional matrix that stores information about the electric power distribution system load nodes and the electric power distribution system substation nodes in a first dimension of the two-dimensional matrix, and stores information about the electric power distribution system switches in a second dimension of the two-dimensional matrix.

13. The computer-implemented method of claim 12, wherein a cell of the incidence matrix includes a value indicative of whether a load/substation node is upstream or downstream from a corresponding switch.

14. The computer-implemented method of claim 1, further including repeating (a)-(f) for all unexamined substation nodes of the electric power distribution system.

15. The computer-implemented method of claim 1, wherein detecting a fault in the system based on the incidence matrix, comprises:
identifying a fault location from the incidence matrix;
identifying a corresponding isolation switch from the incidence matrix; and
opening the corresponding isolation switch, thereby isolating a faulty feeder section of the electric power distribution system from one or more non-faulty sections of the electric power distribution system.

16. The computer-implemented method of claim 15, wherein identifying the fault location, comprises:
identifying a transiently locked out switch in the incidence matrix; and
locking the identified transiently locked out switch in an open state after a reclosing sequence.

17. The computer-implemented method of claim 16, wherein identifying the isolation switch, comprises:
identifying a faulty load node downstream from the locked out switch based on the incidence matrix;
identifying one or more switches connected to the identified downstream load node based on the incidence matrix; and
identifying the identified one or more switches as the isolation switches.

18. The computer-implemented method of claim 1, wherein identifying one or more power restoration paths, comprises identifying one or more power restoration paths based on electrical capacity of the identified available power restoration substations.

19. The computer-implemented method of claim 1, wherein restoring the system based on the restoration control logic, comprises selectively opening and/or closing one or more switches to restore power to the non-faulty out-of-service area of the electric power distribution system.

20. The computer-implemented method of claim 1, wherein restoring the system based on the restoration control logic, comprises:
performing a depth-first search to locate possible restoration sources;
reversing the search to find restoration paths that restore the load and maintain a load balance in each restoration path.

21. The computer-implemented method of claim 20, wherein restoring the system based on the restoration control logic, comprises restoring the system based on an equivalent capacity margin (ECM) of each source.

22. The computer-implemented method of claim 21, further including restoring the system utilizing the restoration substation that has a largest ECM.

23. A computer-implemented method, comprising:
generating a connectivity matrix for an electric power distribution system based on a system topology;
updating a system configuration incidence matrix for the electric power distribution system based on both a depth-first search of the connectivity matrix and information about the electric power distribution system, wherein the information includes at least status information about one or more switches of the electric power distribution system;
detecting a fault in the electric power distribution system based on the incidence matrix;
generating isolation control logic based on the incidence matrix isolating the fault based on isolation control logic;
generating restoration control logic based on a breadth-first search of the incidence matrix, wherein generating restoration control logic based on a breadth-first search of the incidence matrix comprises:
identifying available power restoration substations from the incidence matrix,
determining electrical capacity of the identified available power restoration substations by:
(a) identifying one or more switches connected to an unexamined substation node;
(b) inserting indicia indicative of the identified one or more switches in a queue vector and incrementing a queue tail index based on a number of the identified switches;
(c) searching a load node corresponding to one of the switches in the queue vector and incrementing a queue head index;
(d) determining a load current for the searched load node; and
(e) repeating (b)-(d) until a value of the queue head index equals a value of the queue tail index; and
identifying one or more power restoration paths based on the identified available power restoration substations; and
restoring the electric power distribution system based on the restoration control logic.

24. The computer-implemented method of claim 23, further including repeating (a)-(e) for all unexamined substations.

25. The computer-implemented method of claim 23, wherein determining the load current for the searched load, comprises determining a difference between an electrical load current of the one of the switches and a summation of electrical currents flowing through closed switches connected to the searched load.

26. A system, comprising:
a first component that updates a system configuration incidence matrix of an electric power distribution system based on a depth-first search of a connectivity matrix of an electric power distribution system, wherein the updating comprises:
(a) inserting indicia indicative of an unexamined substation node of the electric power distribution system in a stack vector and incrementing a stack top index;
(b) identifying an unexamined closed switch downstream from the substation node;
(c) identifying an unexamined load node corresponding to the identified closed switch;
(d) inserting indicia indicative of the identified load node in the stack vector and incrementing the stack top index;
(e) inserting indicia indicative of a state of the identified load node in a corresponding cell in the incidence matrix; and
(f) repeating (b)-(e) for all unexamined closed switches downstream from the substation node;
a second component that detects a fault in the system based on the incidence matrix;
a third component that generates isolation control logic based on the incidence matrix;
a fourth component that isolates the fault based on isolation control logic;

a fifth component that generates restoration control logic based on a breadth-first search of the incidence matrix; and a sixth component that restores the system based on the restoration control logic.

27. The system of claim 26, wherein the system executes PLC based programs in a soft PLC environment.

28. The system of claim 26, wherein generating restoration control logic based on a breadth-first search of the incidence matrix comprises:

identifying available power restoration substations from the incidence matrix; and identifying one or more power restoration paths based on the identified available power restoration substations.

29. The system of claim 28, wherein the fifth component further determines electrical capacity of the identified available power restoration substations by:
 (a) identifying one or more switches connected to an unexamined substation node;
 (b) inserting indicia indicative of the identified one or more switches in a queue vector and incrementing a queue tail index based on a number of the identified switches;
 (c) searching a load node corresponding to one of the switches in the queue vector and incrementing a queue head index;
 (d) determining a load current for the searched load node; and
 (e) repeating (b)-(d) until a value of the queue head index equals a value of the queue tail.

* * * * *